United States Patent [19]
English

[11] 3,775,640
[45] Nov. 27, 1973

[54] MOTOR VEHICLE EXTERIOR LIGHT SYSTEM CONTROL CIRCUIT

[75] Inventor: James H. English, Anderson, Ind.

[73] Assignee: General Motors Corporation, Detroit, Mich.

[22] Filed: Oct. 10, 1972

[21] Appl. No.: 295,923

[52] U.S. Cl. ................................................. 315/83
[51] Int. Cl. ............................................ B60q 1/14
[58] Field of Search ............................... 315/82, 83

[56] References Cited
UNITED STATES PATENTS

| | | | |
|---|---|---|---|
| 3,686,506 | 8/1972 | Offner | 315/83 X |
| 3,500,120 | 3/1970 | Schultz | 315/82 |

*Primary Examiner*—Roy Lake
*Assistant Examiner*—James B. Mullins
*Attorney*—Eugene W. Christen et al.

[57] ABSTRACT

A motor vehicle exterior light system control circuit wherein the ungrounded terminal of the vehicle battery is connected to the input terminal of an ignition switch of the type operable to respective positions in which the input terminal is electrically connected to an accessory circuit and an exterior light system circuit output terminals, to an auxiliary circuit output terminal, to only the exterior light system circuit output terminal and to an ignition circuit and the exterior light system circuit output terminals. The exterior light system circuit output terminal of the ignition switch is connected to the input terminal of a conventional headlamp switch of the type operable to positions in which the input terminal is electrically connected to output terminals to which one side of the filaments of the exterior lighting system electrical lamps may be connected. To provide an override feature, the auxiliary circuit output terminal of the ignition switch may be connected to the input terminal of the headlamp switch through a conventional single pole-single throw electrical switch.

2 Claims, 1 Drawing Figure

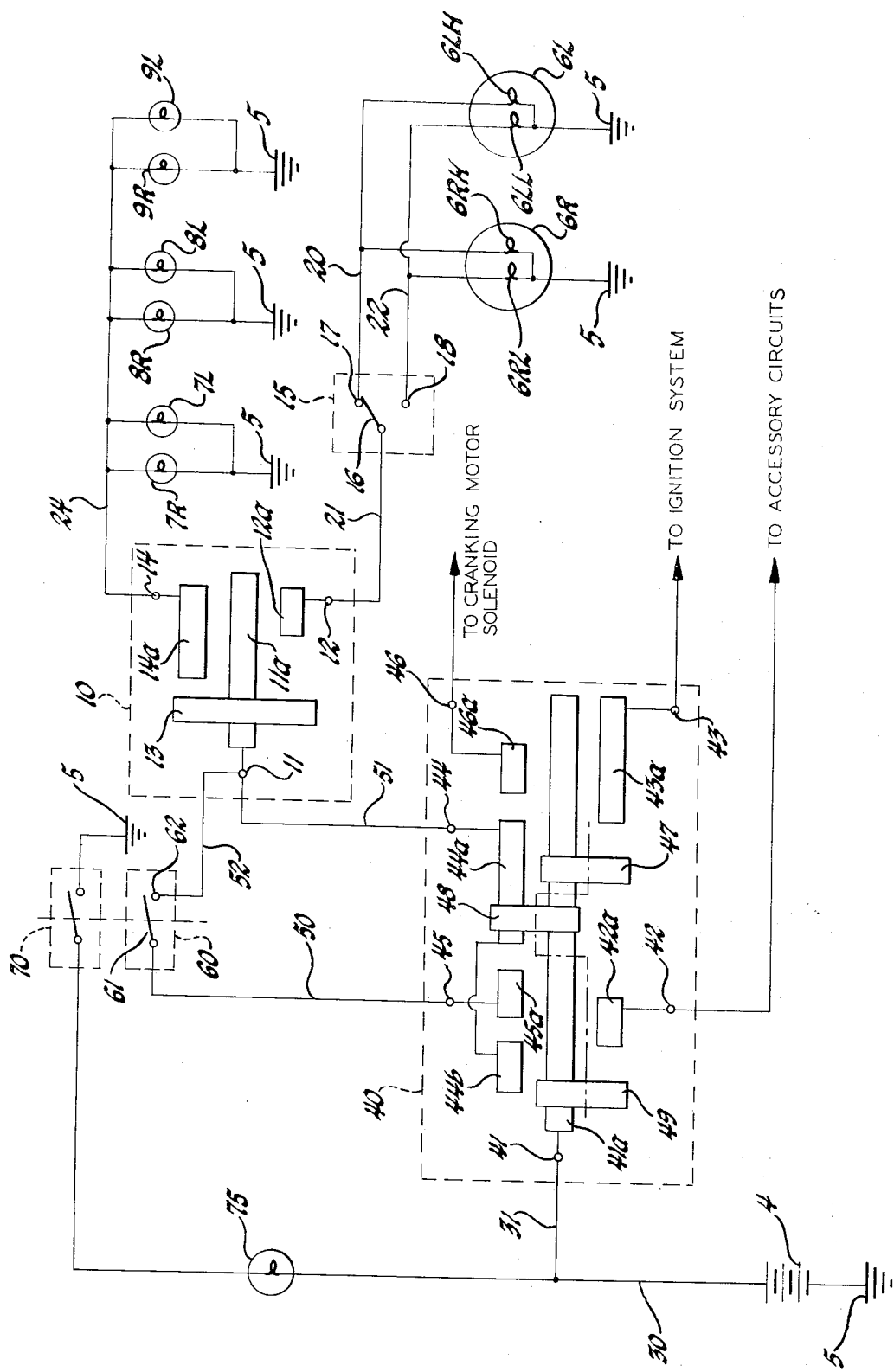

MOTOR VEHICLE EXTERIOR LIGHT SYSTEM CONTROL CIRCUIT

The subject invention is directed to motor vehicle exterior light system control circuits and, more specifically, to motor vehicle exterior light system control circuits wherein the vehicle exterior light system energizing circuits are deenergized by the ignition switch while operated to the "Off-Lock" position.

Numerous systems have been devised for the purpose of warning the operator of an automotive vehicle that the vehicle exterior light lamps are energized with the ignition switch in the "Off" position. Most of these systems have required extensive use of electrical relays and visible or audible warning devices. As there is always the possibility of a malfunction of these electrical devices, systems of this type have proved unsatisfactory. In other systems which provide for the deenergization of the headlight lamp energizing circuit upon the operation of the ignition switch to the "Off" position, the contacts of the ignition switch are connected in series with the headlight lamp switch. While these systems insure that the vehicle headlight lamps will be deenergized while the ignition switch is in the "Off" position, the ignition switch is always vulnerable to accidental turn-off while the vehicle is in operation or even purposeful turn-off should the accelerator stick or the cruise control fail to disengage. Should such circumstances occur during night driving, the resulting extinguishing of the headlight lamps is extremely undesirable. The provision of a motor vehicle exterior light system control circuit which deenergizes the vehicle exterior light system energizing circuits only when the ignition switch is operated to the "Off-Lock" position is desirable to negate the disadvantages of the prior art system.

It is, therefore, an object of this invention to provide an improved motor vehicle exterior light system control circuit.

It is another object of this invention to provide an improved motor vehicle exterior light system control circuit which provides for the deenergization of the vehicle exterior light system energizing circuits while the vehicle ignition switch is operated to the "Off-Lock" position.

In accordance with this invention, a motor vehicle exterior light system control circuit is provided wherein the vehicle exterior light system energizing circuits are completed through the ignition switch and interrupted thereby when operated to the "Off-Lock" position.

For a better understanding of the present invention, together with additional objects, advantages and features thereof, reference is made to the following description and accompanying single FIGURE drawing which sets forth the motor vehicle exterior light system control circuit of this invention in schematic form.

As point of reference or ground potential is the same point electrically throughout the system, it has been represented in the FIGURE by the accepted schematic symbol and referenced by the numeral 5.

As is well known in the automotive art, one side of the filaments of the lamps of the vehicle external light system and one terminal of the vehicle battery are connected to the vehicle chassis or ground 5. In the FIGURE, and without intention or inference of a limitation thereto, the negative polarity terminal of the vehicle battery 4 is shown to be connected to ground 5.

The headlight lamps 6R and 6L, the tail light lamps 7R and 7L, the park light lamps 8R and 8L and the marker light lamps 9R and 9L, if any, may be selectively energized through an electric exterior light energizing switch 10 which may be any of the conventional automotive type headlamp switches well known in the art having an input terminal 11 and an output terminal 12 to which one side of the filaments of the vehicle headlight lamps 6R and 6L may be connected in parallel and an electrically conductive movable contact member 13 which may be operated to a position in which the input terminal 11 is electrically connected thereby to output terminal 12. As with most conventional automotive type headlamp switches, an additional output terminal 14 is provided to which one side of the filaments of the vehicle tail light lamps 7R and 7L, the park light lamps 8R and 8L and the marker light lamps 9R and 9L, if any, may be connected in parallel. Input terminal 11 is electrically connected to internal bus 11a, output terminal 12 is electrically connected to internal bus 12a and output terminal 14 is electrically connected to internal bus 14a, as is well known in the automotive art. In the "Off" position, as shown in the FIGURE, movable contact member 13 is in electrical contact with only internal bus 11a. Movable contact member 13 may be operated in a direction horizontally to the right, as viewing the FIGURE, by an operating member, not shown, to a "Park light" position in which it is in electrical contact with internal bus members 11a and 14a to electrically connect input terminal 11 to output terminal 14 and to a "Headlamp" position in which it is in electrical contact with internal bus members 11a, 12a and 14a to electrically connect input terminal 11 to output terminals 12 and 14.

Most modern automotive vehicles are equipped with a foot operated single pole-double throw dimmer switch through which either the headlight lamp high beam filaments are energized. In the FIGURE, the conventional foot operated automotive type dimmer switch is schematically illustrated as a single pole-double throw electrical switch 15 having a movable contact 16 and two stationary contacts 17 and 18. As is well known in the automotive art, upon successive operations of the operating member, not shown, movable contact 16 is alternately operated into electrical contact with stationary contacts 17 and 18. Consequently, the ungrounded side of the high beam filaments 6RH and 6LH of the headlight lamps are connected to output terminal 12 of headlamp switch 10 through lead 20, stationary contact 17 and movable contact 16 of dimmer switch 15 and lead 21 and the ungrounded side of the low beam filaments 6LR and 6LL of the headlight lamps are connected to the output terminal 12 of headlamp switch 10 through lead 22, stationary contact 18 and movable contact 16 of dimmer switch 15 and lead 21.

The ungrounded side of the filaments of the tail light lamps 7R and 7L, the park light lamps 8R and 8L and the marker light lamps 9R and 9L, if any, are connected to output terminal 14 of headlight lamp switch 10 through lead 24.

The positive polarity terminal of the motor vehicle battery 4 is connected through leads 30 and 31 to the input terminal 41 of ignition switch 40 having an accessory circuit output terminal 42, an ignition circuit output terminal 43, an exterior light system circuit output terminal 44, an auxiliary circuit output terminal 45 and a cranking motor solenoid circuit output terminal 46 and electrically conductive movable contact means 47, 48 and 49 which may be operated to respective positions in which the input terminal 41 is electrically connected thereby to the accessory and exterior light system circuit output terminals 42 and 44, to the auxiliary circuit output terminal 45, to only the exterior light system circuit output terminal 44 and to the ignition and exterior light system circuit output terminals 43 and 44. Input terminal 41 is electrically connected to internal bus 41a, accessory circuit output terminal 42 is electrically connected to internal bus 42a, ignition circuit output terminal 43 is electrically connected to internal bus 43a, exterior light system circuit output terminal 44 is electrically connected to internal buses 44a and 44b, auxiliary circuit output terminal 45 is electrically connected to internal bus 45a and cranking motor solenoid circuit output terminal 46 is electrically connected to internal bus 46a. As is well known in the automotive art, movable contact members 47, 48 and 49 are gang-operated, as indicated in the FIGURE by the dashed interconnecting line. That is, movable contact members 47, 48 and 49 are simultaneously moved horizontally, as viewing the FIGURE, upon the operation of an operating member, not shown. Ignition switch 40 may be operated to the "Accessory" position in which input terminal 41 is electrically connected to the accessory and exterior light system circuit output terminals 42 and 44 by movable contact member 47 bridging internal buses 41a and 42a and movable contact member 48 bridging buses 41a and 44b; to the "Off-Lock" position in which input terminal 41 is electrically connected to auxiliary circuit output terminal 45 by movable contact member 48 bridging internal buses 41a and 45a; to the "Off" position in which input terminal 41 is electrically connected to external light system circuit output terminal 44 by movable contact member 48 bridging internal buses 41a and 44a, as shown in the FIGURE; and to the "Run" position in which input terminal 41 is electrically connected to the ignition and exterior light system circuit output terminals 43 and 44 through movable contact member 47 bridging internal buses 41a and 43a and movable contact member 48 bridging internal buses 41a and 44a. It may be noted that in the "Run" position, input terminal 41 is also electrically connected to the accessory circuit output terminal 42 through movable contact member 49 bridging internal buses 41a and 42a. In the "Crank" position, input terminal 41 is connected to the ignition circuit output terminal 43 and the cranking motor solenoid circuit output terminal 46 through movable contact member 47 bridging internal buses 41a and 43a and by movable contact member 48 bridging internal buses 41a and 46a.

External light system circuit output terminal 44 of ignition switch 40 is connected to the input terminal 11 of headlight lamp switch 10 through lead 51.

With ignition switch 40 in the "Accessory" position, the positive polarity terminal of battery 4 is connected to the input terminal 11 of external light switch 10 through leads 30 and 31, input terminal 41 of ignition switch 40, internal bus 41a, movable contact member 48, internal buses 44b and 44a, exterior light system circuit output terminal 44 and lead 51 and with ignition switch 40 in the "Off" or "Run" position, the positive polarity terminal of battery 4 is connected to input terminal 11 of external light switch 10 through leads 30 and 31, input terminal 41 of ignition switch 40, internal bus 41a, movable contact member 48, internal bus 44a, exterior light system circuit output terminal 44 and lead 51. With ignition switch 40 in the "Crank" or "Off-Lock" position, the circuit through which the positive terminal of battery 4 is connected to input terminal 11 of external light switch 10 is interrupted thereby.

With ignition switch 40 in the "Accessory", the "Off" or the "Run" position, the exterior headlight, tail light, park light and marker light lamps may be selectively energized and deenergized by operating headlamp switch 10 in a normal manner and with ignition switch 40 in the "Off-Lock" position, the exterior light circuit is interrupted, consequently, the exterior headlight, tail light, park light and marker light lamps are "locked out" and cannot be energized by operating headlamp switch 10.

It is apparent that, with the motor vehicle exterior light system control circuit of this invention, all of the exterior light lamps are deenergized and "locked out" when ignition switch 40 is operated to the "Off-Lock" position and that the exterior light lamps will not be deenergized upon the inadvertent or intentional operation of ignition switch 40 to the "Off" position. To provide for a selectable override of the circuit of this invention while ignition switch 40 is in the "Off-Lock" position which will permit the exterior light lamps to be energized and deenergized in a normal manner by the operation of headlamp switch 10, auxiliary circuit output terminal 45 of ignition switch 40 may be connected to the input terminal 11 of headlamp switch 10 through lead 50, movable contact 61 and stationary contact 62 of a single pole-single throw electrical switch 60 and lead 52. Upon the closure of movable contact 61 to stationary contact 62, an energizing circuit for the exterior light lamps may be completed through headlamp switch 10 through a circuit which may be traced from the positive polarity terminal of battery 4 through leads 30 and 31, input terminal 41 of ignition switch 40, internal bus 41a, movable contact member 48, internal bus 45a, auxiliary circuit output terminal 45, lead 50, the closed contacts 61 and 62 of switch 60, lead 52, input terminal 11 of headlamp switch 10, movable contact 13 and output terminals 12 and 14.

If desired, electrical switch 60 may be ganged with the conventional domelight switch 70 as indicated in the drawing. With this arrangement, by turning on the domelight lamp 75, the lockout circuit of this invention may be overridden and the domelight lamp may serve as an indication that the circuit is in the override condition.

The exterior light system control circuit of this invention is particularly adaptable for use with modern motor vehicles having steering column mounted gear selector operating mechanisms which are operable to a "Park" position, of the type well known in the automotive art. The ignition switch 40 is mounted upon the steering column and interlocked with the gear selector operating mechanism in such a manner that it can be operated to the "Off-Lock" position only when the gear selector mechanism has been operated to the "Park" position. With automatic transmissions, the "Park" position is indicated on the gear selector mechanism indicator quadrant and when the gear selector mechanism is operated to this position, the ignition is off and the transmission is "out of gear" and locked.

With gear shift transmissions, the "Park" position may be that position to which the gear selector mechanism is operated to shift the gears of the transmission to reverse.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A motor vehicle exterior light system control circuit comprising, a headlamp switch having an input terminal and an output terminal to which one side of the filaments of said vehicle headlamps may be connected and an electrically conductive movable contact means which may be operated to a position in which said input terminal is electrically connected thereby to said output terminal, an ignition switch having an input terminal to which one terminal of the vehicle battery may be connected, respective accessory circuit, ignition circuit, headlamp circuit and auxiliary circuit output terminals and electrically conductive movable contact means which may be operated to respective positions in which said input terminal is electrically connected thereby to said accessory and headlamp circuit output terminals, to said auxiliary circuit output terminal, to only said headlamp circuit output terminal and to said ignition and headlamp circuit output terminals, means for connecting said headlamp circuit output terminal of said ignition switch to said input terminal of said headlamp switch, an electrical switch having two contacts selectively operable to the electrical circuit closed and open conditions, and means for connecting said auxiliary circuit output terminal of said ignition switch to said input terminal of said headlamp switch through said contacts of said electrical switch.

2. In a motor vehicle having a steering column and a gear selector operating mechanism operable to a "Park" position, an exterior light system control circuit comprising: a headlamp switch having an input terminal and an output terminal to which one side of the filaments of said vehicle headlamps may be connected and an electrically conductive movable contact means which may be operated to a position in which said input terminal is electrically connected thereby to said output terminal; an ignition switch having an input terminal to which one terminal of the vehicle battery may be connected, accessory circuit, ignition circuit, headlamp circuit and auxiliary circuit output terminals and electrically conductive movable contact means which may be operated to an "Accessory" position in which said input terminal is electrically connected thereby to said accessory and headlamp circuit output terminals, to an "Off-Lock" position in which said input terminal is electrically connected thereby to said auxiliary circuit output terminal, to an "Off" position in which said input terminal is electrically connected thereby to only said headlamp circuit output terminal and to a "Run" position in which said input terminal is electrically connected thereby to said ignition and headlamp circuit output terminals, said ignition switch being mounted upon said steering column and interlocked with said gear selector operating mechanism in such a manner that it can be operated to the said "Off-Lock" position only when said gear selector mechanism has been operated to said "Park" position; means for connecting said headlamp circuit output terminal of said ignition switch to said input terminal of said headlamp switch, an electrical switch having two contacts selectively operable to the electrical circuit closed and open conditions, and means for connecting said auxiliary circuit output terminal of said ignition switch to said input terminal of said headlamp switch through said contacts of said electrical switch.

* * * * *